United States Patent
Herklots et al.

(10) Patent No.: US 9,527,989 B2
(45) Date of Patent: Dec. 27, 2016

(54) PROCESS FOR THE PREPARATION OF A COMPOSITION COMPRISING HETEROPHASIC PROPYLENE CO-POLYMER AND TALC

(71) Applicant: SAUDI BASIC INDUSTRIES CORPORATION, Riyadh (SA)

(72) Inventors: Marc Herklots, Geleen (NL); Henrica Norberta Alberta Maria Steenbakkers-Menting, Geleen (NL); Maud Corrina Willie van der Ven, Geleen (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/428,992

(22) PCT Filed: Sep. 17, 2013

(86) PCT No.: PCT/EP2013/069292
§ 371 (c)(1),
(2) Date: Mar. 18, 2015

(87) PCT Pub. No.: WO2014/044680
PCT Pub. Date: Mar. 27, 2014

(65) Prior Publication Data
US 2015/0252180 A1    Sep. 10, 2015

(30) Foreign Application Priority Data

Sep. 19, 2012   (EP) ..................................... 12006582
Sep. 19, 2012   (EP) ..................................... 12006583

(51) Int. Cl.
| | |
|---|---|
| *C08L 23/14* | (2006.01) |
| *C08K 3/34* | (2006.01) |
| *C08K 9/04* | (2006.01) |
| *C08L 23/10* | (2006.01) |
| *B29C 43/00* | (2006.01) |
| *B29C 45/00* | (2006.01) |
| *B29C 49/00* | (2006.01) |
| *C08L 23/12* | (2006.01) |
| *B29K 23/00* | (2006.01) |

(Continued)

(52) U.S. Cl.
CPC ............... *C08L 23/14* (2013.01); *B29C 43/00* (2013.01); *B29C 45/00* (2013.01); *B29C 49/00* (2013.01); *C08K 3/34* (2013.01); *C08K 9/04* (2013.01); *C08L 23/10* (2013.01); *C08L 23/12* (2013.01); *B29K 2023/14* (2013.01); *B29K 2509/00* (2013.01); *B29L 2031/00* (2013.01); *C08L 2205/025* (2013.01); *C08L 2205/03* (2013.01); *C08L 2207/02* (2013.01); *C08L 2308/00* (2013.01)

(58) Field of Classification Search
None
See application file for complete search history.

(56) References Cited

U.S. PATENT DOCUMENTS

| | | | |
|---|---|---|---|
| 3,330,859 A | 7/1967 | Dexter et al. | |
| 3,960,928 A | 6/1976 | Mauz | |
| 4,399,054 A | 8/1983 | Ferraris et al. | |
| (Continued) | | | |

FOREIGN PATENT DOCUMENTS

| | | |
|---|---|---|
| EP | 1607440 A1 | 12/2005 |
| EP | 2274485 A1 | 1/2011 |
| (Continued) | | |

OTHER PUBLICATIONS

Handbook of Fillers, 4th Edition authored by George Wypych Chem Tec Publishing 2016 front matter.*
Handbook of Fillers, 4th Edition authored by George Wypych Chem Tec Publishing 2016, p. 379-392.*

(Continued)

*Primary Examiner* — Marc Zimmer
(74) *Attorney, Agent, or Firm* — Cantor Colburn LLP

(57) ABSTRACT

The invention relates to a Process for the preparation of a composition comprising a heterophasic propylene copolymer and talc, wherein the heterophasic propylene copolymer consists of (a) a propylene-based matrix, wherein the propylene-based matrix consists of a propylene homopolymer and/or a propylene-α-olefin copolymer consisting of at least 70% by mass of propylene and up to 30% by mass of α-olefin, based on the total mass of the propylene-based matrix, wherein the propylene-based matrix is present in an amount of 60 to 95 wt % based on the total heterophasic propylene copolymer and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the composition has a desired melt flow index in the range of 1 to 200 dg/min as measured according to ISO1133 (2.16 kg/230° C.), wherein at least part of the talc is surface-modified and wherein the amount of talc in the composition is from about 0.5 to at most 5 wt % based on the heterophasic propylene copolymer, comprising the step of (a) melt-mixing the heterophasic propylene copolymer with the talc and a peroxide, wherein the amount of peroxide is chosen such that a composition comprising a heterophasic propylene copolymer and talc having the desired melt flow index is obtained.

12 Claims, No Drawings

(51) Int. Cl.
*B29K 509/00* (2006.01)
*B29L 31/00* (2006.01)

(56) References Cited

U.S. PATENT DOCUMENTS

| | | | |
|---|---|---|---|
| 4,472,524 A | 9/1984 | Albizzati | |
| 5,777,020 A | 7/1998 | Nagai et al. | |
| 8,003,725 B2 | 8/2011 | Chapman et al. | |
| 2003/0114579 A1* | 6/2003 | Mori | C08L 23/04 524/515 |
| 2005/0277742 A1 | 12/2005 | Roegiers | |
| 2009/0304968 A1 | 12/2009 | De Palo et al. | |
| 2009/0305069 A1* | 12/2009 | Goeldel | C08L 23/10 428/516 |
| 2010/0261846 A1 | 10/2010 | Shimano et al. | |
| 2010/0298456 A1* | 11/2010 | Nakajima | C08J 9/0061 521/134 |
| 2013/0253124 A1* | 9/2013 | Bernreiter | C08L 23/10 524/528 |
| 2015/0232643 A1 | 8/2015 | Herklots et al. | |
| 2015/0232652 A1 | 8/2015 | Herklots | |

FOREIGN PATENT DOCUMENTS

| | | |
|---|---|---|
| EP | 2397517 A1 | 12/2011 |
| WO | 2005123827 A1 | 12/2005 |
| WO | 2006010414 A1 | 2/2006 |
| WO | 2010149546 A1 | 12/2010 |

OTHER PUBLICATIONS

International Search Report for International Application No. PCT/EP2013/069292; International Filing Date: Sep. 17, 2013; Date of Mailing: Nov. 5, 2013; 9 Pages.
Ser van der Ven, "Polypropylene and other Polyolefins: Polymerization and Characterization," Studies in Polymer Science 7, Elsevier (1990), pp. 1-11.
Written Opinion of the International Searching Authority for International Application No. PCT/EP2013/069292; International Filing Date: Sep. 17, 2013; Date of Mailing: Nov. 5, 2013; 5 Pages.
Non-Final Office Action; U.S. Appl. No. 14/429,217, filed Mar. 18, 2015; Date of Mailing: Dec. 7, 2015; 19 Pages.
International Search Report for International Application No. PCT/EP2013/069295; International Filing Date: Sep. 17, 2013; Date of Mailing: Oct. 31, 2013; 4 Pages.
Written Opinion of the International Searching Authority for International Application No. PCT/EP2013/069295; International Filing Date: Sep. 17, 2013; Date of Mailing: Oct. 31, 2013; 5 Pages.
International Search Report for International Application No. PCT/EP2013/069296; International Filing Date: Sep. 17, 2013; Date of Mailing: Dec. 13, 2013, 4 Pages.
Reingruber et al., "Identification of Degradation Products of Antioxidants in Polyolefins by Liquid Chromatography Combined with Atmospheric Pressure PHotoionisation Mass Spectrometry," Polymer Degradation and Stability 95 (2010) pp. 740-745.
Written Opinion of the International Searching Authority for International Application No. PCT/EP2013/069296; International Filing Date: Sep. 17, 2013; Date of Mailing: Dec. 13, 2013; 5 Pages.

\* cited by examiner

US 9,527,989 B2

PROCESS FOR THE PREPARATION OF A COMPOSITION COMPRISING HETEROPHASIC PROPYLENE CO-POLYMER AND TALC

CROSS REFERENCE TO RELATED APPLICATIONS

This application is a 371 of International Application No. PCT/EP2013/069292, filed Sep. 17, 2013 which claims priority to European Application Nos. 12006582.6, filed Sep. 19, 2012 and 12006583.4, filed Sep. 19, 2012 which are hereby incorporated by reference in their entirety.

The invention relates to a process for the preparation of a composition comprising a heterophasic propylene copolymer and talc, a composition obtained or obtainable by said process and to the use of said composition.

Heterophasic propylene copolymer, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

In industry, there is a continuous search for methods to modify the rheology of polyolefins in liquid phase, in particular to reduce their viscosity. The viscosity reduction is often also described as "vis-breaking", "melt-shifting", "modifying rheology" or "controlling rheology". It is known that (organic) peroxides may be used to reduce the viscosity. There are different ways in which the (organic) peroxides behave in conventional degradation processes upon heating and melting conditions. On the one hand, under certain process conditions, the peroxides initially decompose to produce free radicals, which then abstract hydrogen from a tertiary carbon of the polypropylene backbone to form free radicals on the polymer, and which further recombine. On the other hand, peroxides initiate a breakage of the longest chains of the polymer molecules and, subsequently, this results in a decrease in viscosity of the polymer, an increase in melt flow rate, and a narrower molecular weight distribution, characteristics which are directly responsible for improved flow properties of polypropylene in order to make the product more suitable for certain applications.

It is known to add peroxides to the heterophasic propylene copolymer to obtain impact propylene copolymers having a higher melt flow rate. This makes it for example possible to obtain several impact propylene copolymers with different melt flow rates from one and the same base grade.

An example of such a "melt-shifting" process is described in US2005/0277742A2. US2005/0277742A1 discloses a process for preparing a controlled rheology propylene heterophasic copolymer by degrading a polypropylene with a linear dialkyl peroxide having a backbone containing at least 6 carbon atoms and a double or triple bond comprising the steps of: either
(a) reactor polymerizing a propylene heterophasic copolymer;
(b) extruding the propylene heterophasic copolymer of step (a), with said linear dialkyl peroxide having a backbone containing at least 6 carbon atoms and a double or triple bond, and optionally with one or more filler(s), in an extruder, at a temperature sufficient to maintain the copolymer in the molten state; or
(c) extruding a propylene (co)polymer with said linear dialkyl peroxide having a backbone containing at least 6 carbon atoms and a double or triple bond, optionally with one or more elastomeric modifier(s) and/or one or more filler(s), in an extruder, at a temperature sufficient to maintain the copolymer in the molten state.

To increase the stiffness of the heterophasic propylene copolymer, talc may be added as a filler. However, when the stiffness of the heterophasic propylene copolymer is increased by talc, more peroxide is needed in order to obtain the same increase in melt flow rate of a heterophasic propylene copolymer as compared to when talc is not present in the heterophasic propylene copolymer. It is undesired to use high amounts of peroxides, since high amounts of typical peroxide degradation products, for example methane and acetone may lead to safety issues during the manufacturing process. Also, the use of high amounts of peroxides adds to the cost of the heterophasic polypropylene, which is undesired from an economical point of view. Last but not least, the use of high amounts of peroxides leads to high amounts of peroxide degradation products and impurities in the final polymer. These peroxide degradation products may be released during the life-time of the heterophasic propylene copolymer composition, which is undesired, as they may cause unpleasant odours and may affect organoleptic properties. Also, high amounts of peroxide degradation products make the heterophasic propylene copolymer unsuitable for food contact applications.

Therefore, it is an object of the invention to provide a heterophasic polypropylene composition that combines a high stiffness with a good impact strength and a high flow, but which does not contain a high amount of peroxide degradation products.

This object is achieved by a process for the preparation of a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, an d wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the composition has a desired melt flow index in the range of 1 to 200 dg/min as measured according to ISO1133 (2.16 kg/230° C.),
comprising the steps of
(a) melt-mixing a propylene copolymer with a talc to obtain a masterbatch, and
(b) melt-mixing the masterbatch with the heterophasic propylene copolymer and a peroxide to obtain the composition comprising a heterophasic propylene copolymer, a propylene copolymer and talc, wherein the amount of peroxide is chosen such that a composition comprising a heterophasic propylene copolymer, a propylene copolymer and talc having the desired melt flow index is obtained It has been found that with the process of the present invention, a heterophasic polypropylene composition can be prepared that combines the favourable properties of a high stiffness, a good impact strength and a high flow with a decreased amount of peroxide degradation products.

Furthermore, the process of the invention is an easy and cost-effective process. Also, the heterophasic polypropylene composition thus prepared may maintain its (mechanical) properties.

For purpose of the present invention, stiffness is determined by measuring the flexural modulus according to ASTM D790-10.

For purpose of the present invention, impact strength is determined by measuring the Izod impact strength at 23° C. according to ISO 180 4A.

For purpose of the present invention, flow is determined by measuring the melt flow rate, also called melt flow index or melt index according to ISO1133 (2.16 kg/230° C.).

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratio.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. No. 4,399,054 and U.S. Pat. No. 4,472,524.

The heterophasic propylene copolymer of the composition of the invention consists of a propylene-based matrix and a dispersed ethylene-α-olefin copolymer. The propylene-based matrix forms the continuous phase in the heterophasic propylene copolymer.

The propylene-based matrix consists of a propylene homopolymer and/or a propylene-α-olefin copolymer consisting of at least 70% by mass of propylene and up to 30% by mass of α-olefin, for example ethylene, for example consisting of at least 80% by mass of propylene and up to 20% by mass of α-olefin, for example ethylene, for example consisting of at least 90% by mass of propylene and up to 10% by mass of α-olefin, for example ethylene, based on the total mass of the propylene-based matrix. Preferably, the propylene-based matrix consists of a propylene homopolymer.

Preferably, the α-olefin in the propylene-α-olefin copolymer is selected from the group of α-olefins having 2 or 4-10 carbon atoms and more preferably the α-olefin is ethylene.

The melt flow index (MFI) of the propylene-based matrix (before it is mixed into the composition of the invention) may be in the range of for example 0.3 to 200 dg/min, for example from 0.3 to 80 dg/min measured according to ISO1133 (2.16 kg/230° C.), for example in the range from 3 to 70, for example in the range from 10 to 60 dg/min, for example in the range from 15 to 40 dg/min.

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.5 to 10 microns, as may be determined by transmission electron microscopy (TEM).

The MFI of the dispersed ethylene-α-olefin copolymer (before it is mixed into the composition of the invention) may for example be in the range from 0.001 to 10 dg/min (measured according to ISO1133 (2.16 kg/230° C.)), preferably in the range from 0.006 to 5 dg/min.

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

Preferably, the amount of ethylene in the ethylene-α-olefin copolymer is in the range of 20-65 wt %, for example in the range of 40 to 60 wt % based on the ethylene-α-olefin copolymer, for example the amount of ethylene in the ethylene-α-olefin copolymer is at least 30 wt % and/or for example at most 55 wt % based on the ethylene-α-olefin copolymer.

In the heterophasic polypropylene in the composition of the invention, the sum of the total weight of the propylene-based matrix and the total weight of the dispersed ethylene-α-olefin copolymer is 100 wt %

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefins copolymer include but are not limited to propylene, 1-butene, 1-pentene, 4-methyl-1-pentene, 1-hexen, 1-heptene and 1-octene.

The process of the invention comprises the steps of
(a) melt-mixing a propylene copolymer with a talc to obtain a masterbatch
(b) melt-mixing the masterbatch with the heterophasic propylene copolymer and a peroxide to obtain the composition comprising a heterophasic propylene copolymer, a propylene copolymer and talc.

In the process of the invention, a propylene copolymer is melt-mixed with a talc to obtain a masterbatch. Melt-mixing may be performed by methods known to the skilled person, for example using an extruder and the conditions as described herein for step b).

The propylene copolymer may be any propylene copolymer, for example a propylene-α-olefin copolymer, wherein the α-olefin is selected from the group of α-olefins having 2 or 4-10 C-atoms and wherein the α-olefin content is up to 10 wt % based on the propylene copolymer; or the propylene copolymer may be a random propylene-ethylene copolymer, for example wherein the ethylene content is up to 10 wt % based on the propylene copolymer; or the propylene copolymer may be a propylene homopolymer; or the propylene copolymer may be a heterophasic propylene copolymer.

Preferably, the propylene copolymer is a heterophasic propylene copolymer, more preferably the propylene copolymer is the same heterophasic propylene copolymer as used in step b) of the process of the invention.

In a special embodiment therefore, the invention relates to a process according to the invention comprising the steps of
(a) melt-mixing a heterophasic propylene copolymer with a talc to obtain a masterbatch, and
(b) melt-mixing the masterbatch with the same heterophasic propylene copolymer (as used in step a)) and a peroxide to obtain the composition comprising the heterophasic propylene copolymer and talc.

The weight ratio of the talc to the propylene copolymer in the masterbatch is in principle not critical and may be varied between wide ranges.

In principle, the weight ratio of talc to the propylene copolymer is not critical. Preferably, the weight ratio of talc to propylene copolymer in the masterbatch is from 1:9 to 9:1, more preferably from 1:3 to 9:1, for example from 1:1 to 9:1. High weight ratios of talc to propylene copolymer in the masterbatch are preferred as this decreases the volume of the masterbatch needed. A high volume of masterbatch is undesired as this makes it impractical for dosing to the heterophasic propylene copolymer.

Preferably, the weight ratio of the propylene copolymer used in step a), preferably a heterophasic propylene copolymer, to the heterophasic propylene copolymer used in step b), preferably the same heterophasic propylene copolymer (as used in step a) is 1:1 to 1:20, for example from 1:5 to 1:20 or 1:5 to 1:15 or 1:5 to 1:10.

The masterbatch may contain the propylene copolymer and the talc only, but may also comprise additives and/or polar substances suitable for surface-modification of the talc, for example as described herein, for example ethylene-bis-stearamide.

With melt-mixing is meant that the masterbatch, the heterophasic propylene copolymer and the peroxide are mixed at a temperature that exceeds the melting point of the heterophasic propylene copolymer and the propylene copolymer in the masterbatch. Melt-mixing may be done using techniques known to the skilled person, for example in an extruder. Generally, in the process of the invention, melt-mixing is performed at a temperature in the range from 20-300° C.

For example, the melt-mixing of step a) of the process of the invention may be performed at a temperature in the range from 20-300° C.

For example, the melt-mixing of step b) of the process of the invention may be performed at a temperature in the range from 20-330° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 180° C. in the feed zone to 300° C. at the die. Preferably, the temperature in the extruder varies from 200 to 265° C.; lower temperatures may impede reactions between the peroxide and an optional co-agent, for example polyfunctional monomers, such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

The residence time in the extruder for the heterophasic propylene copolymer may be lower than 1 minute, for example between 10 and 40 seconds.

Talc is a relatively abundant, inexpensive, highly hydrophobic and generally unreactive mineral. It can be categorized as a hydrated magnesium silicate and its main components can be represented by, inter alia, one or more of the formulas $(Si_2O_5)_2Mg_3(OH)_2$, $Si_8Mg_6O_{20}(OH)_4$ or $Mg_{12}Si_{16}O_{40}(OH)_8$. Talcs suitable for use as additives to a heterophasic propylene copolymer are commercially available from for example Imerys Luzenac. 'Talc' and 'talcum' are used interchangeably herein.

Talc is available in several particle sizes, for example the particle sizes of talc are classified as 'ultrafine' (average particle size of lower than 1 μm, for example an average particle size in the range of 0.5 to 0.9 1 μm) and 'fine' (average particle size of at least 1 μm, for example an average particle size of 1 μm to 5 μm). Preferably, fine or ultrafine powder particles are used in the process of the present invention.

Depending on the desired stiffness, the amount of talc used may be varied. For practical reasons, the amount of surface-modified talc in the composition of the invention is preferably from 0.5 to 5 wt % based on the total amount of propylene copolymer of step a) and the heterophasic propylene copolymer of step b). For example, the amount of surface-modified talc in the composition is at least 1 wt %, for example at least 1.5 wt % and/or for example at most 4 wt %, for example at most 3.5 wt %, for example at most 3 wt % based on the propylene copolymer of step a) and the heterophasic propylene copolymer of step b).

Preferably, the composition that is prepared by the process of the invention has a melt flow index in the range of 1 to 200 dg/min as measured according to ISO01133 (2.16 kg/230° C.). For example, the melt flow index is at least 1, for example at least 5 or for example at least 14 dg/min and/or for example at most 200 dg/min, for example at most 80 dg/min or for example at least 20 dg/min as measured according to ISO1133 (2.16 kg/230° C.). Preferably, the melt flow index of the composition that is prepared by the process of the invention is in the range from 5 to 80 dg/min, for example in the range from 14 to 20 dg/min as measured according to ISO1133 (2.16 kg/230° C.).

Examples of suitable peroxides include organic peroxides having a decomposition half-life of less than 1 minute at the average process temperature during the melt-mixing of the heterophasic propylene copolymer with the talc and the peroxide. Suitable organic peroxides include but are not limited to dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate, cumene hydroperoxide, diisopropyl benzene hydroperoxide, 1,3-bis(t-butylperoxy-isopropyl)benzene, dicumyl peroxide, tert-butylperoxy isopropyl carbonate and any combination thereof. Preferably, a dialkyl peroxides is employed in the process according to the present invention. More preferably, the peroxide is α,α'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane. Preferably, the peroxide is selected from the group of non-aromatic peroxides.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition. Typically, the amount of peroxide used will lie in the range of 0.02 to 0.5 wt % based on the heterophasic propylene copolymer.

In the process of the invention or in the composition of the invention at least part of the talc may be surface-modified, that means that mixtures of surface-modified talc with non-surface modified talc may also be used. Preferably, at least 80 wt % of the talc used in the process of the invention or present in the composition of the invention is surface-modified, more preferably at least 90 wt %, even more preferably at least 95 wt %, in particular at least 98 wt %, more in particular at least 99 wt %, most in particular all talc used in the process of the invention or present in the composition of the invention is surface-modified.

Other words that are commonly used for surface-modified talc are surface-treated talc, coated talc. Surface-modified talcs are known to the person skilled in the art and are commercially available from for example Imerys Luzenac. Surface-modified talcs may be prepared by adding a surface modifier to the talc. The nature and concentration of the modifier depends on the desired benefit in the final talc composite, like improvement of the bond between the talcum and polymer or to improve the dispersion of the talc in the polymer. Examples of surface modifiers are silanes, amines, glycols, stearates, sorbates and titanates.

Preferably, the surface-modified talc is a talc that is surface-modified with a polar substance selected from the group of glycols, silanes and amines.

In a special embodiment, the invention relates to a process of the invention, wherein the surface-modified talc is prepared by mixing of a talc with a polar substance, preferably ethylene-bis-stearamide. This may be done off-line (i.e. prior to melt-mixing the talc and the propylene copolymer) or the surface-modified talc may be prepared in situ (i.e. by adding the polar substance together with the talc in the melt-mixing step).

Without wishing to be bound by theory, it is believed that by mixing the talc with a polar substance, the talc can be 'coated' in situ.

Examples of the polar substances are as described herein. Preferably, the mixing of talc is done with ethylene-bis-stearamide (also referred to as EBS or EBA).

In another aspect, the invention relates to a composition obtained or obtainable by the process of the invention.

Specifically, the invention relates to a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, and wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and
wherein the composition has a desired melt flow index in the range of 1 to 200 dg/min as measured according to ISO1133 (2.16 kg/230° C.), and
wherein the amount of volatile organic compounds as measured through the VOC-value according to VDA278 (30 min, 180° C.) and determined by gas chromatography is less than 1500 ppm based on the total composition.

For purpose of the invention when reference is made to standard VDA278, the version of October 2011 is referred to.

Preferably, the amount of volatile organic compounds (VOC-value) as measured through the VOC-value according to VDA278 (30 min, 180° C.) and determined by gas chromatography (version October 2011) is less than 1300 ppm, more preferably less than 1000 ppm, for example less than 750 ppm, for example less than 600 ppm, for example less than 500 ppm, for example less than 400 ppm, for example less than 300 ppm based on the total composition.

In another embodiment, the invention relates to a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, and wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and wherein the composition has a desired melt flow index in the range of 1 to 200 dg/min as measured according to ISO1133 (2.16 kg/230° C.),
wherein the amount of volatile compounds (FOG-value) as measured through the FOG-value according to VDA278 on the second heating (first heating 30 min at 90° C., second heating 1 hour at 120° C.) is less than 500 ppm, for example less than 400 ppm, for example less than 350 ppm, for example less than 300 ppm, for example less than 250 ppm, for example less than 200 ppm, for example less than 150 ppm.

In another aspect, the invention relates to a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, and wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
wherein the composition has a desired melt flow index in the range of 1 to 200 dg/min as measured according to ISO1133 (2.16 kg/230° C.),
wherein the amount of butanol emitted as measured using VDA 278 (10 min, 180° C.) as determined with gas chromatography-mass spectrometry (GC-MS) is less than 100 ppm, for example less than 80 ppm, for example less than 70 ppm, for example less than 60 ppm, for example less than 50 ppm, for example less than 40 ppm, for example less than 30 ppm.

Such composition having an amount of butanol of less than 100 ppm, preferably less than 80 ppm, more preferably less than 60 ppm, most preferably less than 40 ppm based on the total composition is especially suitable for use in food contact applications.

Therefore, the invention also relates to the use of a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and
wherein the composition has a desired melt flow index in the range of 1 to 200 dg/min as measured according to ISO1133 (2.16 kg/230° C.),
wherein the amount of butanol emitted as measured using VDA 278 (10 min, 180° C.) as determined with gas chromatography-mass spectrometry (GC-MS) is less than 100 ppm, for example less than 80 ppm, for example less than 70 ppm, for example less than 60 ppm, for example less than 50 ppm, for example less than 40 ppm, for example less than 30 ppm in food contact applications.

In another aspect, the invention relates to a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and
wherein the composition has a desired melt flow index in the range of 1 to 200 dg/min as measured according to ISO1133 (2.16 kg/230° C.),
wherein the amount of acetone emitted as measured using VDA 278 (10 min, 180° C.) as determined with gas chromatography-mass spectrometry (GC-MS) is less than 4 ppm, for example less than 3 ppm, for example less than 2 ppm, for example less than 1 ppm.

In another aspect, the invention relates to a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, wherein the propylene-based matrix is present in an amount of 60 to 95 wt % based on the total heterophasic propylene copolymer, and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, and
wherein the composition has a desired melt flow index in the range of 1 to 200 dg/min as measured according to ISO1133 (2.16 kg/230° C.),
wherein the amount of isopropenylacetylbenzene as measured using VDA278 (10 min, 180° C.) as determined with gas chromatography-mass spectrometry (GC-MS) is less than 20, for example less than 15, for example less than 10 ppm based on the total composition, and/or
wherein the amount of diacetylbenzene as measured using VDA278 (10 min, 180° C.) as determined with gas chromatography-mass spectrometry (GC-MS) is less than 90, for example less than 80, for example less than 30, for example less than 25 ppm.

The invention also relates a composition comprising a heterophasic propylene copolymer, a propylene copolymer and talc, wherein the heterophasic propylene copolymer consists of
(a) a propylene-based matrix, wherein the propylene-based matrix consists of a propylene homopolymer and/or a propylene-α-olefin copolymer consisting of at least 70% by mass of propylene and up to 30% by mass of α-olefin, for example ethylene, based on the total mass of the propylene-based matrix, wherein the propylene-based matrix is present in an amount of 60 to 95 wt % based on the total heterophasic propylene copolymer, and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the composition has a desired melt flow index in the range of 1 to 200 dg/min as measured according to ISO1133 (2.16 kg/230° C.), and wherein the amount of volatile organic compounds as measured through the VOC-value according to VDA278 (30 min, 180° C.) and determined by gas chromatography is less than 1500 ppm, preferably less than 1300 ppm, more preferably less than 1000 ppm, for example less than 750 ppm, for example less than 600 ppm, for example less than 500 ppm, for example less than 400 ppm, for example less than 300 ppm based on the total composition, and/or wherein the amount of volatile compounds (FOG-value) as measured through the FOG-value according to VDA278 on the second heating (first heating 30 min at 90° C., second heating 1 hour at 120° C.) is less than 500 ppm, for example less than 400 ppm, for example less than 350 ppm, for example less than 300 ppm, for example less than 250 ppm, for example less than 200 ppm, for example less than 150 ppm, and/or wherein the amount of butanol emitted as measured using VDA 278 (10 min, 180° C.) as determined with gas chromatography-mass spectrometry (GC-MS) is less than 100 ppm, for example less than 80 ppm, for example less than 70 ppm, for example less than 60 ppm, for example less than 50 ppm, for example less than 40 ppm, for example less than 30 ppm, and/or wherein the amount of acetone emitted as measured using VDA 278 (10 min, 180° C.) as determined with gas chromatography-mass spectrometry (GC-MS) is less than 4 ppm, for example less than 3 ppm, for example less than 2 ppm, for example less than 1 ppm, and/or wherein the amount of isopropenylacetylbenzene as measured using VDA278 (10 min, 180° C.) as determined with gas chromatography-mass spectrometry (GC-MS) is less than 20, for example less than 15, for example less than 10 ppm based on the total composition, and/or wherein the amount of diacetyl benzene as measured using VDA278 (10 min, 180° C.) as determined with gas chromatography-mass spectrometry (GC-MS) is less than 90, for example less than 80 ppm, for example less than 30, for example less than 25 ppm, preferably wherein the amount of isopropenylacetylbenzene as measured using VDA278 (10 min, 180° C.) as determined with gas chromatography-mass spectrometry (GC-MS) is less than 20, for example less than 15, for example less than 10 ppm based on the total composition and/or wherein the amount of diacetyl benzene as measured using VDA278 (10 min, 180° C.) as determined with gas chromatography-mass spectrometry (GC-MS) is less than 90, for example less than 80 ppm, for example less than 30, for example less than 25 ppm.

More in particular, the invention relates to a composition obtained or obtainable by the process of the invention wherein the amount of the VOC-value according to VDA278 (30 min, 180° C.) and determined by gas chromatography is less than 1500 ppm, preferably less than 1300 ppm, more preferably less than 1000 ppm, for example less than 750 ppm, for example less than 600 ppm, for example less than 500 ppm, for example less than 400 ppm, for example less than 300 ppm based on the total composition, and/or wherein the amount of volatile compounds (FOG-value) as measured through the FOG-value according to VDA278 on the second heating (first heating 30 min at 90° C., second heating 1 hour at 120° C.) is less than 500 ppm, for example less than 400 ppm, for example less than 350 ppm, for example less than 300 ppm, for example less than 250 ppm, for example less than 200 ppm, for example less than 150 ppm, and/or wherein the amount of butanol emitted as measured using VDA 278 (10 min, 180° C.) as determined with gas chromatography-mass spectrometry (GC-MS) is less than 100 ppm, for example less than 80 ppm, for example less than 70 ppm, for example less than 60 ppm, for example less than 50 ppm, for example less than 40 ppm, for example less than 30 ppm, and/or wherein the amount of acetone emitted as measured using VDA 278 (10 min, 180° C.) as determined with gas chromatography-mass spectrometry (GC-MS) is less than 4 ppm, for example less than 3 ppm, for example less than 2 ppm, for example less than 1 ppm, and/or wherein the amount of isopropenylacetylbenzene as measured using VDA278 (10 min, 180° C.) as determined with gas chromatography-mass spectrometry (GC-MS) is less than 20, for example less than 15, for example less than 10 ppm based on the total composition, and/or wherein the amount of diacetyl benzene as measured using VDA278 (10 min, 180° C.) as determined with gas chromatography-mass spectrometry (GC-MS) is less than 30, for example less than 25 ppm, preferably wherein the amount of isopropenylacetylbenzene as measured using VDA278 (10 min, 180° C.) as determined with gas chromatography-mass spectrometry (GC-MS) is less than 20, for example less than 15, for example less than 10 ppm based on the total composition, and/or wherein the amount of diacetyl benzene as measured using VDA278 (10 min, 180° C.) as determined with gas chromatography-mass spectrometry (GC-MS) is less than 90, for example less than 80 ppm, for example less than 30, for example less than 25 ppm.

For purpose of the invention, the VOC-value, the FOG-value, the amount of butanol emitted, the amount of acetone emitted and the amount of isopropenylacetylbenzene and the amount of diacetyl benzene are measured on a sample taken within 1 hour after it was prepared by melt-mixing and stored in airtight bags for no longer than 24 hours at a maximum of 23° C.

The compositions of the invention may further comprise additives For example, the compositions may further contain nucleating agents, clarifiers, stabilizers, release agents, pigments, dyes, plasticizers, anti-oxidants, antistatics, scratch resistance agents, high performance fillers, impact modifiers, flame retardants, blowing agents, recycling additives, coupling agents, anti microbials, anti-fogging additives, slip additives, anti-blocking additives, polymer processing aids such as lubricants and the like, etc., surface tension modifiers, co-agents, for example 1,4-butanediol dimethacrylate (BDDMA), acrylate or methacrylate; components that enhance interfacial bonding between the polymer and the talc, for example maleated polypropylene etc. Such additives are well known in the art. The skilled person can readily select any suitable combination of additives and additive amounts without undue experimentation. The amount of additives depends on their type and function. Typically, their amounts will be from 0 to 30 wt %, for example from 0 to 20 wt %, for example from 0 to 10 wt % or from 0 to 5 wt % based on the total composition.

The sum of all components added in the process of the invention to form the composition comprising a heterophasic propylene copolymer and talc should add up to 100% by weight.

Some or all of the components may be pre-mixed with the polypropylene copolymer, prior to melt-mixing the heterophasic polypropylene with the talc or they may be added to the melt-mixing step a). In case melt-mixing occurs in the extruder, the components may be added in any order and by any conventional means, for example at the same or different sites of the extruder.

In another aspect, the invention relates to the use of the compositions of the invention in injection moulding, blow moulding, extrusion moulding, compression moulding, thin-walled injection moulding, etc, for example in food contact applications.

In yet another aspect, the invention relates to a shaped article comprising the composition of the invention.

The composition of the invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

The shaped article of the invention also has the advantage of low VOC-value and/or a low FOG-value and/or a low amount of acetone and/or a low amount of butanol and/or a low amount of isopropenylacetylbenzene and/or a low amount of diacetylbenzene.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

Measurement Methods

The VOC emission was measured according to VDA278 (version October 2011; 180° C., 30 min) on the granulated compounds.

The FOG emission was measured according to VDA278 (version October 2011; first heating 90° C., 30 min, second heating 1 hour at 120° C.).

The amount of isopropenylacetylbenzene was measured using VDA278 (10 min at 180° C.) and determined with GC-MS.

The amount of diacetylbenzene was measured using VDA278 (10 min at 180° C.) and determined with GC-MS.

For purpose of the present invention, stiffness is determined by measuring the flexural modulus according to ASTM D790-10. Flexural modulus was determined on 3.2 mm thick specimens according to ISO37/2, parallel orientation.

For purpose of the present invention, impact strength is determined by measuring the Izod impact strength at 23° C. according to ISO 180 4A, Test geometry: 65*12.7*3.2 mm, notch 45° according to ISO 37/2 perpendicular orientation.

For purpose of the present invention, flow is determined by measuring the melt flow rate, also called melt flow index or melt index according to ISO1133 (2.16 kg/230° C.).

Method

Several samples were prepared using a starting material having a melt flow index (MFI) of 1.5. This material is a propylene heterophasic copolymer having a propylene polymer matrix wherein the propylene-based matrix (in this case a propylene homopolymer) is present in an amount of 75 wt % based on the total heterophasic propylene copolymer and 25 wt % of an ethylene-propylene copolymer consisting of 55 wt % of ethylene.

Talcum masterbatch was prepared by dosing Steamic T1CF talc (uncoated talc) or Steamic T1DF talc (coated talc) (3.4 kg) via a separate feeder in a 1:1 weight ratio with part of the heterophasic propylene copolymer (3.7 kg) and the stabilizer Irganox B225 (0.5 wt %). Steamic T1CF and Steamic T1DF were provided by Imerys Luzenac. Two talcum masterbatches were prepared: one with 0.3 wt % ethylene-bis-stearamide (EBA) and one without ethylene-bis-stearamide.

A mixture of the processing aid calcium stearate (0.05 wt %), the stabilizer Irganox B225 (0.5 wt %), the peroxide (Luperco 802PP40, which is di(tert-butylperoxyisopropyl-benzene) and heterophasic propylene copolymer was mixed prior to dosing it to the hopper of the extruder.

The talcum masterbatch was dosed to the extruder via a separate feeder to the mixture described above.

The remaining heterophasic propylene copolymer (3.3 kg) was extruded in a twin screw ZE21 extruder with one of the talcum masterbatches or with Steamic T1CF talc and the additive mixture containing the peroxide (Luperco 802PP40, which is di(tert-butylperoxyisopropylbenzene, obtained from Imerys Luzenac). The amount and composition of the additive mixture was chosen such that the amount of calcium stearate in the final composition was 500 ppm (based on the total composition) and the amount of Irganox B225 was 5000 ppm (based on the total composition). The peroxide concentration in the additive mixture was adjusted to control the melt flow index of the finished material to the desired value. The amount of talc in the talcum masterbatch was chosen such that the amount of talc in the finished material was 0; 2.5 or 5 wt % based on the total composition.

A typical temperature profile in the extruder is 20-20-40-100-170-230-240-240-240° C., at a throughput of 2.5 kg/h at 300 rpm.

The sample compositions differed on the way the talcum was introduced into the composition (via masterbatch or directly in the extruder). For sample number 1, the talcum used was Steamic T1CF (uncoated), introduced via a masterbatch. For sample number 2, the talcum used was Steamic T1CF (uncoated, introduced via a masterbatch containing 0.3 wt % EBA. For comparative sample A, the talcum used was Steamic T1CF, which was introduced directly into the extruder.

Example 1

The talc concentration in the compositions was varied and the peroxide concentration in the powder/additive mixture was adjusted to control the melt flow index to 18 dg/min.

Table 1 shows the amount of peroxide that is needed to obtain a melt flow index as determined as described herein of 18 dg/min.

TABLE 1

Required amount of peroxide concentration to shift the MFI of the heterophasic propylene copolymer from 1.5 to 18 dg/min

| Ex. | process description | Required peroxide concentration at a talcum concentration of 0 wt % (wt %) | Required peroxide concentration at a talcum concentration of 2.5 wt % (wt %) | Required peroxide concentration at a talcum concentration of 5 wt % (wt %) |
|---|---|---|---|---|
| 1 | Masterbatch T1CF | 0.16 | 0.18 | 0.25 |
| 2 | masterbatch T1CF + EBA | 0.16 | 0.16 | 0.16 |
| A | T1CF directly to extruder | 0.16 | 0.20 | 0.45 |

Conclusion 1

As can be seen from the results in table 1, the amount of peroxide that is needed to shift the MFI of Sabic® PP PHC27 to 18 dg/min is considerably higher for comparative sample A, than for the compositions of the invention (which add talc in the form of a masterbatch to the heterophasic propylene copolymer in the extruder instead of directly to the heterophasic propylene copolymer in the extruder). It can also be seen that preferably, the talc is coated in situ, that is preferably EBA is mixed with the talc in the masterbatch, prior to extrusion of the masterbatch with the heterophasic propylene copolymer.

Example 2

Determination of the Amount of Peroxide Decomposition Products

The amount of peroxide decomposition products (di-acetylbenzene and isopropenylacetylbenzene) of the compositions of examples 1, 2 comparative example A and comparative example B (without talc) were determined in the final composition using the method described above. The tert-butanol, acetone and methane concentrations were calculated. The results are presented in Table 2 below.

TABLE 2

Amount of peroxide degradation products

| Ex. | talc | tBuOH (ppm) | Acetone (ppm) | Methane (ppm) | diacetyl-benzene (ppm) | Iso-propenyl Acetyl-benzene (ppm) |
|---|---|---|---|---|---|---|
| 1 | Masterbatch T1CF | 40 | 2 | 5 | 30 | 14 |
| 2 | Masterbatch T1CF + EBA | 26 | 1 | 3 | 22 | 9 |
| A | T1CF directly to extruder | 72 | 4 | 9 | 37 | 21 |
| B | Without talc | 26 | 1 | 3 | 27 | 10 |

Conclusion 2

As can be seen from Table 2, the amount of peroxide degradation products in the compositions of the invention (prepared using a masterbatch) is considerably lower than in the composition of comparative sample A. Furthermore, in situ coating of the talc in the masterbatch by mixing in EBA further reduces the amount of peroxide degradation products in the compositions of the invention. This has the advantage for organoleptic performance, lower emission levels and less safety issues.

Example 3

Determination of the Mechanical Properties

The Izod impact at 23° C. and the modulus II at 23° C. were also measured. The results are presented in Table 3.

TABLE 3

Izod impact and flexural modulus of the heterophasic propylene copolymer Sabic ® PP PHC27 having an MFI of 18 dg/min, using different talcs.

| | | 0 wt % talc | | 2.5 wt % talc | | 5 wt % talc | |
|---|---|---|---|---|---|---|---|
| Ex. | | Imp. (kJ/m2) | Mod. (MPa) | Imp. (kJ/m2) | Mod. (MPa) | Imp. (kJ/m2) | Mod. (MPa) |
| 1 | M | — | — | 65.49 | 1157 | 64.92 | 1232 |
| 2 | M + E | — | — | 62.64 | 1134 | 63.30 | 1228 |
| A | D | — | — | 64.99 | 1134 | 65.20 | 1190 |
| B | No talc | 60.80 | 993 | — | — | — | — |

M = masterbatch
M + E = masterbatch with 0.3 wt % EBA
D = talc added directly to the extruder without being present in the masterbatch
Imp. = Izod impact at 23° C. (kJ/m$^2$)
Mod. = Flexural modulus II at 23° C. (MPa)

Conclusion 3

As can be seen from the results in Table 3, even though different talcs were used and the amount of peroxides used is less for samples 1-3 than for comparative sample A, the Izod impact and flexural modulus remain the same.

This shows that the mechanical properties of the composition of the invention even though containing a lower amount of peroxide decomposition products remain comparable to those of composition containing considerably higher amounts of peroxide decomposition products.

The invention claimed is:
1. A process for the preparation of a composition comprising a heterophasic propylene copolymer and talc, wherein the heterophasic propylene copolymer consists of
    (a) a propylene-based matrix, wherein the propylene-based matrix consists of a propylene homopolymer and/or a propylene-α-olefin copolymer consisting of at least 70% by mass of propylene and up to 30% by mass of ethylene, based on the total mass of the propylene-based matrix, and wherein the propylene-based matrix is present in an amount of 60 to 95 wt % based on the total heterophasic propylene copolymer and,
    (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
        wherein the composition has a desired melt flow index in the range of 1 to 200 dg/min as measured according to ISO1133 (2.16 kg/230° C.),
wherein at least 80 wt % of the talc is surface-modified with a polar substance comprising ethylene-bis-stearamide and wherein the amount of talc in the composition is from about 0.5 to at most 5 wt % based on the heterophasic propylene copolymer,
    comprising the step of
        (a) melt-mixing the heterophasic propylene copolymer with the talc and a peroxide,
            wherein the amount of peroxide is chosen such that a composition comprising a heterophasic propylene copolymer and talc having the desired melt flow index is obtained,
            wherein the α-olefin in the propylene-α-olefin copolymer is selected from the group of α-olefins having 2 or 4-10 carbon atoms,
            wherein the amount of ethylene in the ethylene-α-olefin copolymer is in the range of 20-65 wt % based on the ethylene-α-olefin copolymer and
            wherein the α-olefin in the ethylene-α-olefin copolymer is chosen from the group of α-olefins having 3 to 8 carbon atoms and any mixtures thereof.
2. The process according to claim 1, wherein the amount of ethylene in the ethylene-α-olefin copolymer is in the range of 20-65 wt % based on the ethylene-α-olefin copolymer.
3. The process according to claim 1, wherein the propylene-based matrix consists of a propylene homopolymer.
4. The process according to claim 1, wherein the α-olefin in the ethylene-α-olefin copolymer is chosen from the group of α-olefins having 3 to 8 carbon atoms and any mixtures thereof.
5. The process according to claim 1, wherein the α-olefin in the ethylene-α-olefin copolymer is propylene.
6. The process according to claim 1, wherein all talc used in the process is surface-modified.
7. The process according to claim 1, wherein the peroxide is α,α'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane.
8. A process for the preparation of a composition comprising a heterophasic propylene copolymer and talc, wherein the heterophasic propylene copolymer consists of
    (a) a propylene-based matrix, wherein the propylene-based matrix consists of a propylene homopolymer and/or a propylene-α-olefin copolymer consisting of at least 70% by mass of propylene and up to 30% by mass of ethylene, based on the total mass of the propylene-based matrix, and wherein the propylene-based matrix is present in an amount of 60 to 95 wt % based on the total heterophasic propylene copolymer and,
    (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
        wherein the composition has a desired melt flow index in the range of 1 to 200 dg/min as measured according to ISO1133 (2.16 kg/230° C.),
    wherein at least part of the talc is surface-modified, wherein the surface-modified talc is prepared by mixing of a talc with a polar substance, wherein the polar substance is ethylene-bis-stearamide, and wherein the amount of talc in the composition is from about 0.5 to at most 5 wt % based on the heterophasic propylene copolymer,
    comprising the step of
        (a) melt-mixing the heterophasic propylene copolymer with the talc and a peroxide,
            wherein the amount of peroxide is chosen such that a composition comprising a heterophasic propylene copolymer and talc having the desired melt flow index is obtained,
            wherein the α-olefin in the propylene-α-olefin copolymer is selected from the group of α-olefins having 2 or 4-10 carbon atoms,
            wherein the amount of ethylene in the ethylene-α-olefin copolymer is in the range of 20-65 wt % based on the ethylene-α-olefin copolymer and
        wherein the α-olefin in the ethylene-α-olefin copolymer is chosen from the group of α-olefins having 3 to 8 carbon atoms and any mixtures thereof.
9. A composition obtained or obtainable by the process of claim 1.
10. Shaped article comprising the composition comprising a heterophasic propylene copolymer and talc, wherein the heterophasic propylene copolymer consists of
    (a) a propylene-based matrix, wherein the propylene-based matrix consists of a propylene homopolymer and/or a propylene-α-olefin copolymer consisting of at least 70% by mass of propylene and up to 30% by mass of α-olefin, based on the total mass of the propylene-based matrix wherein the propylene-based matrix is present in an amount of 60 to 95 wt % based on the total heterophasic propylene copolymer and,
    (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
        wherein the composition has a desired melt flow index in the range of 1 to 200 dg/min as measured according to ISO1133 (2.16 kg/230° C.),
    wherein at least 80 wt % of the talc is surface-modified with ethylene-bis-stearamide and wherein the amount of talc in the composition is from about 0.5 to at most 5 wt % based on the heterophasic propylene copolymer, and wherein the amount of volatile organic compounds as measured through the VOC-value according to VDA278 (30 min, 180° C.) and determined by gas chromatrography is less than 1500 ppm, and/or wherein the amount of volatile compounds (FOG-value) as measured through the FOG-value according to VDA278 on the second heating (first heating 30 min at 90° C., second heating 1 hour at 120° C.) is less than 500 ppm, and/or wherein the amount of butanol emitted as measured using VDA 278 (10 min, 180° C.) as determined with gas chromatrography-mass spectrometry (GC-MS) is less than 100 ppm, and/or wherein the amount of acetone emitted as measured using VDA 278 (10 min, 180° C.) as determined with gas chromatrography-mass spectrometry (GC-MS) is less than 4 ppm, and/or wherein the amount of isopropenylacetylbenzene as measured using VDA278 (10 min, 180° C.) as determined with gas chromatrography-mass spectrometry (GC-MS) is less than 20, based on the total composition, and/or wherein the amount of diacetyl benzene as measured using VDA278 (10 min, 180° C.) as determined with gas chromatrography-mass spectrometry (GC-MS) is less than 30, and wherein the α-olefin in the propylene-α-olefin copolymer is selected from the group of α-olefins having 2 or 4-10 carbon atoms, wherein the amount of ethylene in the ethylene-α-olefin copolymer is in the range of 20-65 wt % based on the ethylene-α-olefin copolymer, and wherein the α-olefin in the ethylene-α-olefin copolymer is chosen from the group of α-olefins having 3 to 8 carbon atoms and any mixtures thereof.

11. A method for forming a shaped article, comprising:
moulding the composition of claim 9, wherein the moulding is injection moulding, blow moulding, extrusion moulding, compression moulding or thin-walled injection moulding.

12. The process according to claim 1, wherein the polar substance polar substance further comprises at least one of glycols and amines.

* * * * *